(12) United States Patent
Sun et al.

(10) Patent No.: US 11,544,624 B2
(45) Date of Patent: **\*Jan. 3, 2023**

(54) SYSTEMS AND METHODS FOR DETERMINING ESTIMATED TIME OF ARRIVAL

(71) Applicant: BEIJING DIDI INFINITY TECHNOLOGY AND DEVELOPMENT CO., LTD., Beijing (CN)

(72) Inventors: Shujuan Sun, Beijing (CN); Xinqi Bao, Beijing (CN); Zheng Wang, Beijing (CN)

(73) Assignee: BEIJING DIDI INFINITY TECHNOLOGY AND DEVELOPMENT CO., LTD., Beijing (CN)

( \* ) Notice: Subject to any disclaimer, the term of this patent is extended or adjusted under 35 U.S.C. 154(b) by 459 days.

This patent is subject to a terminal disclaimer.

(21) Appl. No.: 16/749,943

(22) Filed: Jan. 22, 2020

(65) Prior Publication Data

US 2020/0160225 A1  May 21, 2020

Related U.S. Application Data

(63) Continuation of application No. PCT/CN2017/095045, filed on Jul. 28, 2017.

(51) Int. Cl.
*G06Q 50/30* (2012.01)
*G06N 20/00* (2019.01)
(Continued)

(52) U.S. Cl.
CPC ......... *G06N 20/00* (2019.01); *G01C 21/3697* (2013.01); *G06Q 50/30* (2013.01)

(58) Field of Classification Search
CPC ..... G06N 20/00; G01C 21/3697; G06Q 50/30
See application file for complete search history.

(56) References Cited

U.S. PATENT DOCUMENTS

| 6,230,151 B1 | 5/2001 | Agrawal et al. |
| 2007/0008173 A1 | 1/2007 | Schwartz |

(Continued)

FOREIGN PATENT DOCUMENTS

| CN | 103258421 A | \* | 8/2013 |
| CN | 103258421 A | | 8/2013 |

(Continued)

OTHER PUBLICATIONS

Park et al., "Learning user preferences of route choice behaviour for adaptive route guidance", IET Intell. Transp. Syst., 1, (2), pp. 159-166 (Year: 2007).\*

(Continued)

*Primary Examiner* — Talia F Crawley
(74) *Attorney, Agent, or Firm* — Metis IP LLC

(57) ABSTRACT

The present disclosure relates to methods and systems for determining an estimated time of arrival (ETA). The methods may include obtaining feature data related to an on-demand service order; obtain a parallel computing framework; determining a global ETA model based on the feature data and the parallel computing framework; and determining an ETA for a target route based on the global ETA model.

18 Claims, 9 Drawing Sheets

(51) Int. Cl.
*G01C 21/36* (2006.01)
*G01C 21/00* (2006.01)

(56) References Cited

U.S. PATENT DOCUMENTS

| | | | | | |
|---|---|---|---|---|---|
| 2010/0262362 | A1* | 10/2010 | Naito | ................. | G08G 1/0969 |
| | | | | | 715/810 |
| 2013/0262349 | A1* | 10/2013 | Bouqata | ................. | G06N 20/10 |
| | | | | | 706/12 |

FOREIGN PATENT DOCUMENTS

| | | | | | |
|---|---|---|---|---|---|
| CN | 103377552 | A | * | 10/2013 | |
| CN | 103377552 | A | | 10/2013 | |
| CN | 104121918 | A | | 10/2014 | |
| CN | 105185115 | A | | 12/2015 | |
| CN | 105185115 | A | * | 12/2015 | |
| CN | 105303617 | A | | 2/2016 | |
| CN | 105303817 | A | * | 2/2016 | |
| CN | 105550374 | A | * | 5/2016 | ............. G06F 16/90 |
| CN | 105550374 | A | | 5/2016 | |
| CN | 106250461 | A | * | 12/2016 | |
| CN | 106250461 | A | | 12/2016 | |

OTHER PUBLICATIONS

International Search Report in PCT/CN2017/095045 dated Apr. 23, 2018, 4 pages.
Written Opinion in PCT/CN2017/095045 dated Apr. 23, 2018, 4 pages.
Liu, Xinyang et al., Parallel Strategies for Training Decision Tree, Computer Science, 31(8). 2004, 3 pages.

* cited by examiner

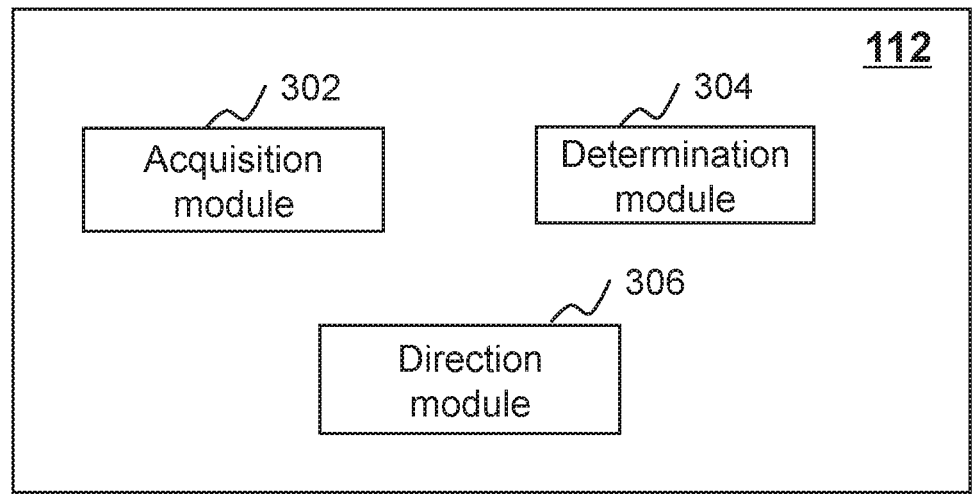
FIG. 3-A
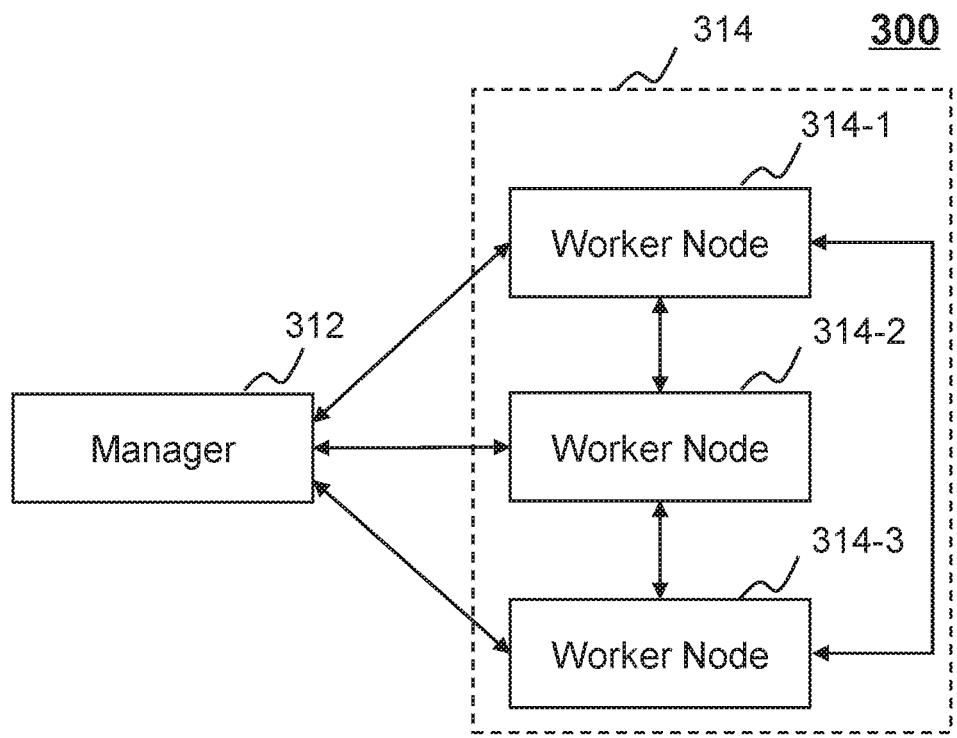
FIG. 3-B

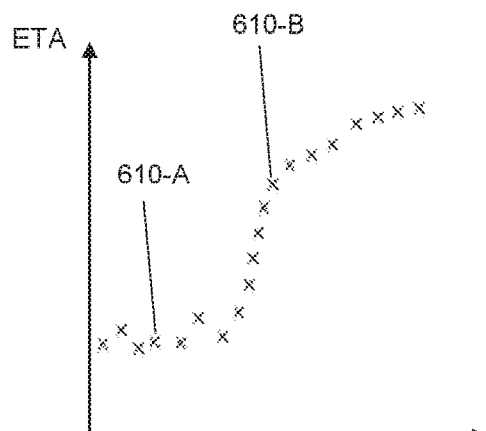
FIG. 6-A
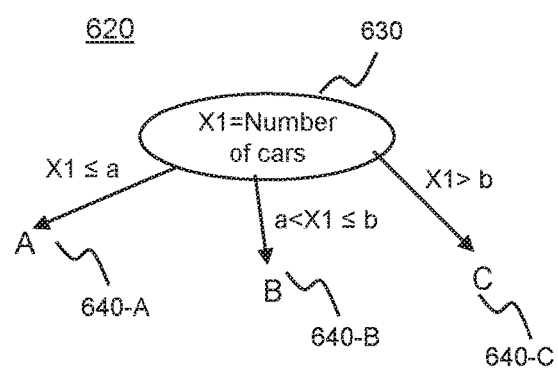
FIG. 6-B
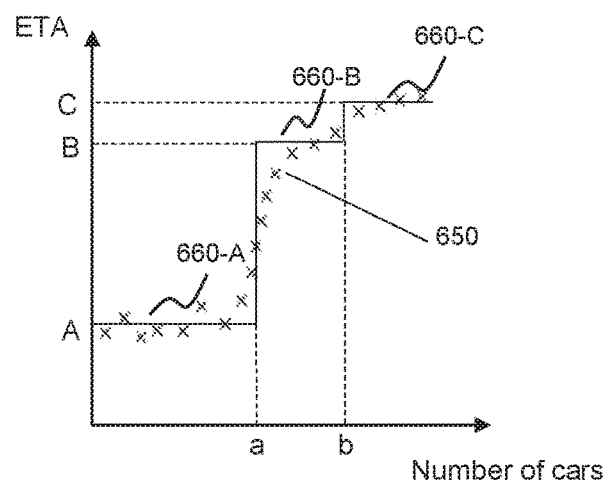
FIG. 6-C
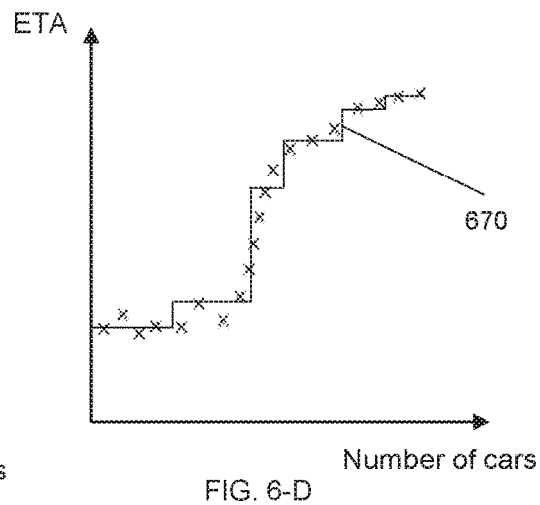
FIG. 6-D
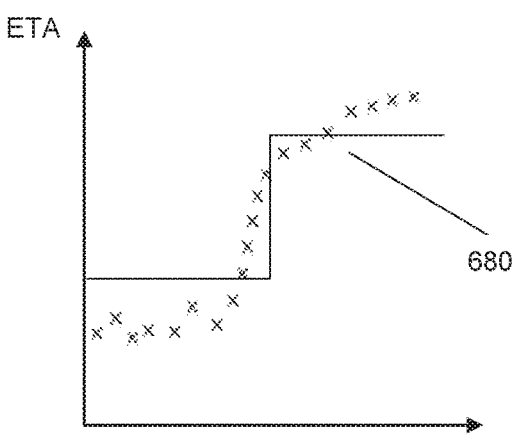
FIG. 6-E

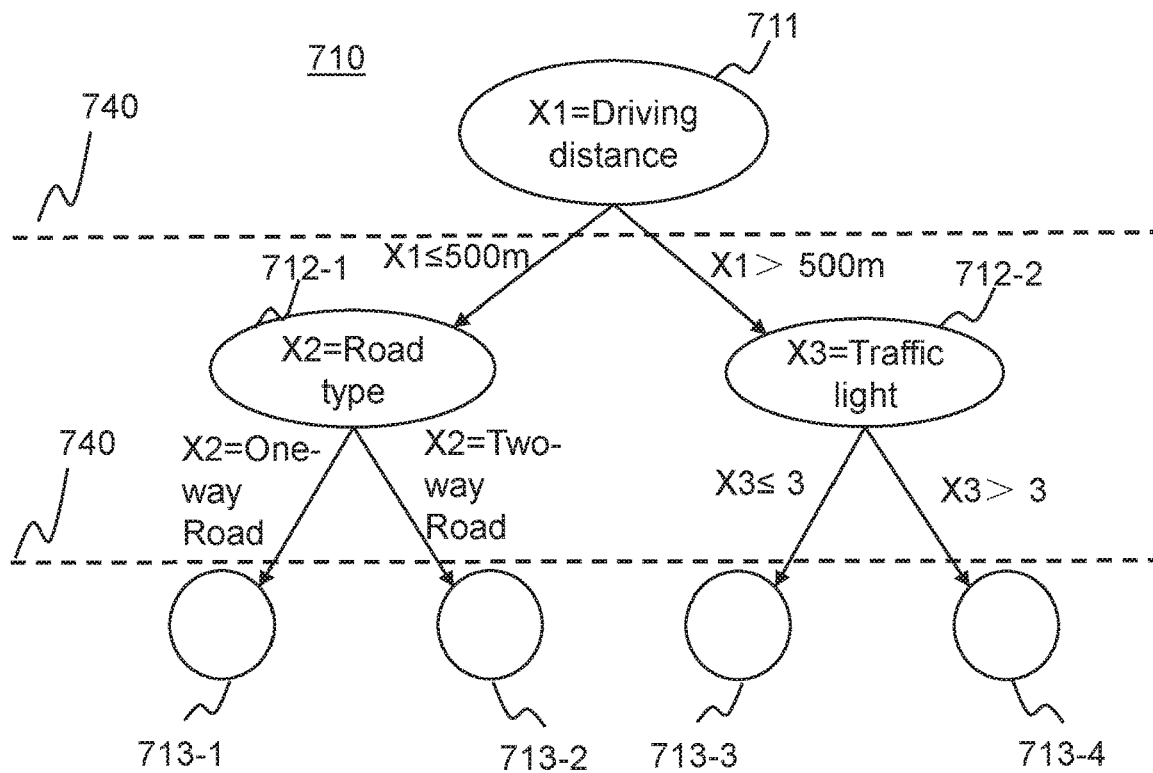
FIG. 7-A
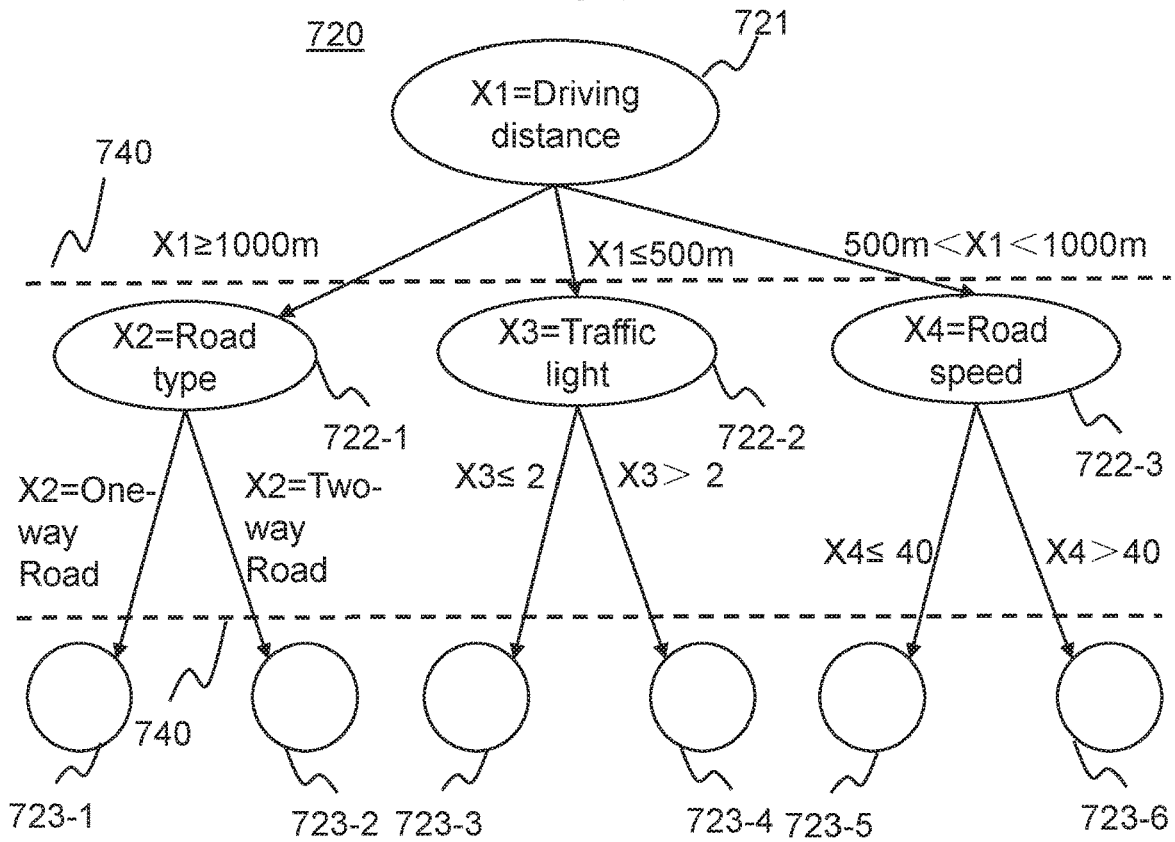
FIG. 7-B

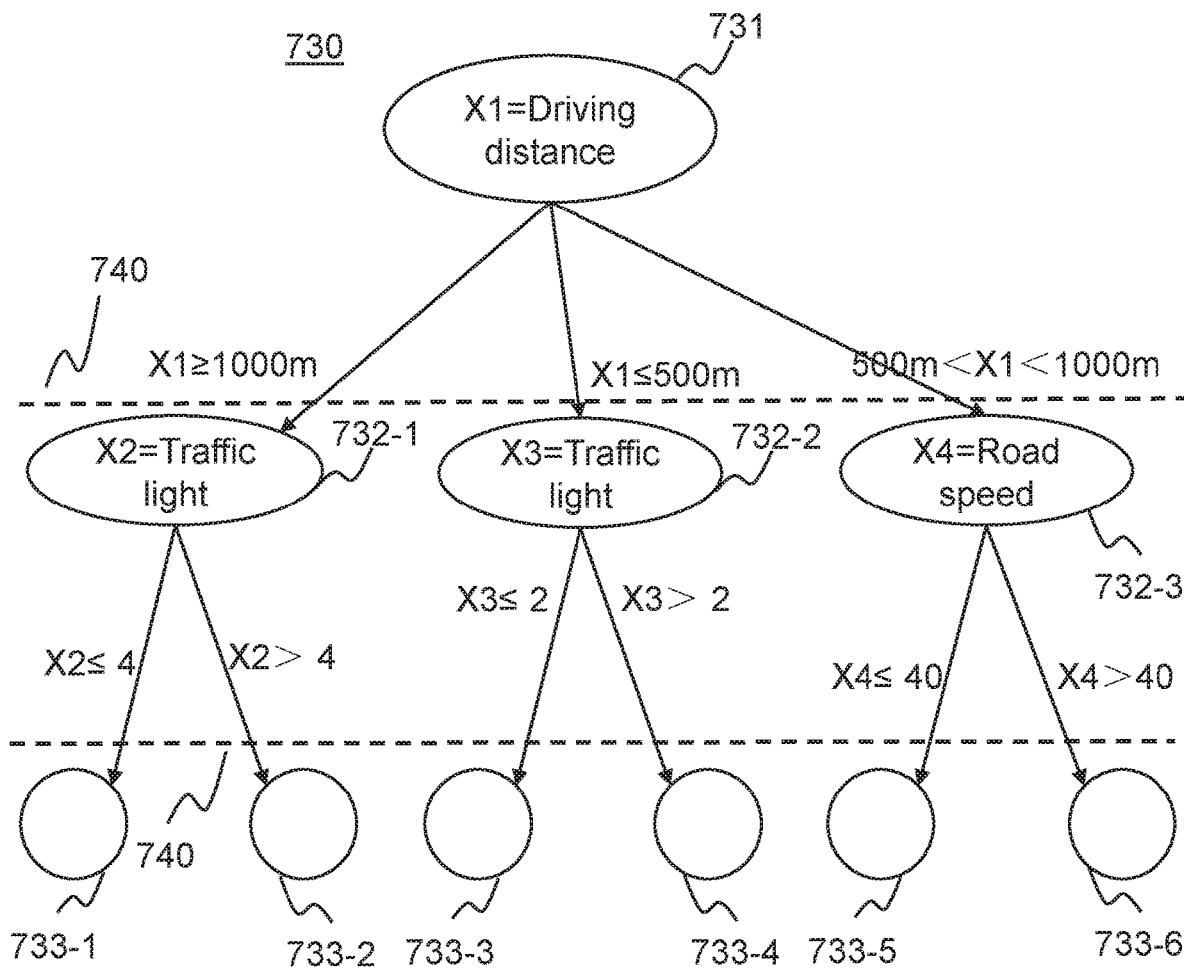
FIG. 7-C

SYSTEMS AND METHODS FOR DETERMINING ESTIMATED TIME OF ARRIVAL

CROSS-REFERENCE TO RELATED APPLICATION

This application is a continuation of International Application No. PCT/CN2017/095045, filed on Jul. 28, 2017, the contents of which are incorporated herein by reference.

TECHNICAL FIELD

This present disclosure generally relates to methods and systems for determining an estimated time of arrival (ETA), and more particularly, to methods and systems for determining an estimated time of arrival by implementing decision tree models on a parallel computing framework.

BACKGROUND

On-demand transportation services, such as online taxi hailing services, provides a lot of convenience in people's daily life. Through an online on-demand service platform, a user may request an on-demand service by an application installed in his/her smart phone. The online on-demand service platform may provide an estimated time of arrival (ETA) of a route from a start location to a destination based on the request. However, the generation of ETA is normally slow and inaccurate.

SUMMARY

According to an aspect of the present disclosure, a system is provided. The system may include at least one storage medium and at least one processor configured to communicate with the at least one storage medium. The at least one storage medium may include a set of instructions. When the at least one storage medium executes the set of instructions, the at least one processor may be directed to perform one or more of the following operations. The at least one processor may receive a start location and a destination from a user device. The at least one processor may obtain a global ETA model. For generating the global ETA model, the at least one processor may obtain feature data related to an on-demand service. The at least one processor may determine a plurality of sub-ETA models. The at least one processor may obtain a parallel computing framework including a plurality of worker nodes, and each of the plurality of worker nodes may be associated with a sub-ETA model of the plurality of sub-ETA models. The at least one processor may allocate the feature data to the plurality of worker nodes. The at least one processor may train the plurality of sub-ETA models based on the feature data. The at least one processor may generate the global ETA model based on the plurality of trained sub-ETA models. Furthermore, the at least one processor may determine an ETA for a target route connecting the start location and the destination based on the global model and send the determined ETA to the user device.

In some embodiments, the at least one processor may split each of the plurality of worker nodes into a root node and a plurality of leaf nodes based on a split rule.

In some embodiments, the at least one processor may classify the plurality of leaf nodes into a plurality of groups and determine at least one barrier based on the plurality of leaf nodes. The at least one barrier is configured between two of the plurality of groups of the leaf nodes.

In some embodiments, the at least one barrier may prevent the plurality of worker nodes from executing a first group of the leaf node and a second group of the leaf node simultaneously.

In some embodiments, the parallel computing framework may include at least one of Spark framework, Hadoop, Phoenix, Disco, or Mars.

In some embodiments, the at least one processor may determine a number of the plurality of worker nodes and allocate the feature data based on the number of the plurality of worker node on the plurality of worker nodes. The feature data allocated on each of the plurality of worker nodes may be different.

In some embodiments, the plurality of the worker nodes may include a first worker node operating a first sub-ETA model with first feature data as input and a second worker node operating a second sub-ETA model with second feature data as input. The first worker node may transmit the first feature data to the second worker node.

In some embodiments, the global ETA model includes an Extreme Gradient Boosting (XGboost) model.

According to another aspect of the present disclosure, a method is provided. The method may include one or more of the following operations. A processor may receive a start location and a destination from a user device. The processor may obtain a global ETA model. For generating the global ETA model, the processor may obtain feature data related to an on-demand service. The processor may determine a plurality of sub-ETA models. The processor may obtain a parallel computing framework including a plurality of worker nodes, and each of the plurality of worker nodes is associated with a sub-ETA model of the plurality of sub-ETA models. The processor may allocate the feature data to the plurality of worker nodes. The processor may train the plurality of sub-ETA models based on the feature data. The processor may generate the global ETA model based on the plurality of trained sub-ETA models. Furthermore, the processor may determine an ETA for a target route connecting the start location and the destination based on the global model and send the determined ETA to the user device.

According to another aspect of the present disclosure, a non-transitory computer readable medium is provided. The non-transitory computer readable medium may comprise executable instructions that cause at least one processor to effectuate a method. The method may include one or more of the following operations. The at least one processor may receive a start location and a destination from a user device. The at least one processor may obtain a global ETA model. For generating the global ETA model, the at least one processor may obtain feature data related to an on-demand service. The at least one processor may determine a plurality of sub-ETA models. The at least one processor may obtain a parallel computing framework including a plurality of worker nodes, and each of the plurality of worker nodes is associated with a sub-ETA model of the plurality of sub-ETA models. The at least one processor may allocate the feature data to the plurality of worker nodes. The at least one processor may train the plurality of sub-ETA models based on the feature data. The at least one processor may generate the global ETA model based on the plurality of trained sub-ETA models. Furthermore, the at least one processor may determine an ETA for a target route connecting the start location and the destination based on the global model and send the determined ETA to the user device.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3-A is a block diagram illustrating an exemplary processing engine 112 according to some embodiments of the present disclosure;

FIG. 3-B is a schematic diagram illustrating an exemplary parallel computing framework according to some embodiments of the present disclosure;

FIG. 6-A is a schematic diagram illustrating exemplary training data of a model according to some embodiments of the present disclosure;

FIG. 6-B is a schematic diagram illustrating a structure of a model according to some embodiments of the present disclosure;

FIG. 6-C, FIG. 6-D and FIG. 6-E are schematic diagrams illustrating exemplary training data of models and the trained models according to some embodiments of the present disclosure;

FIG. 7-A, FIG. 7-B and FIG. 7-C are schematic diagrams illustrating structures of models according to some embodiments of the present disclosure.

DETAILED DESCRIPTION

Figure 1:
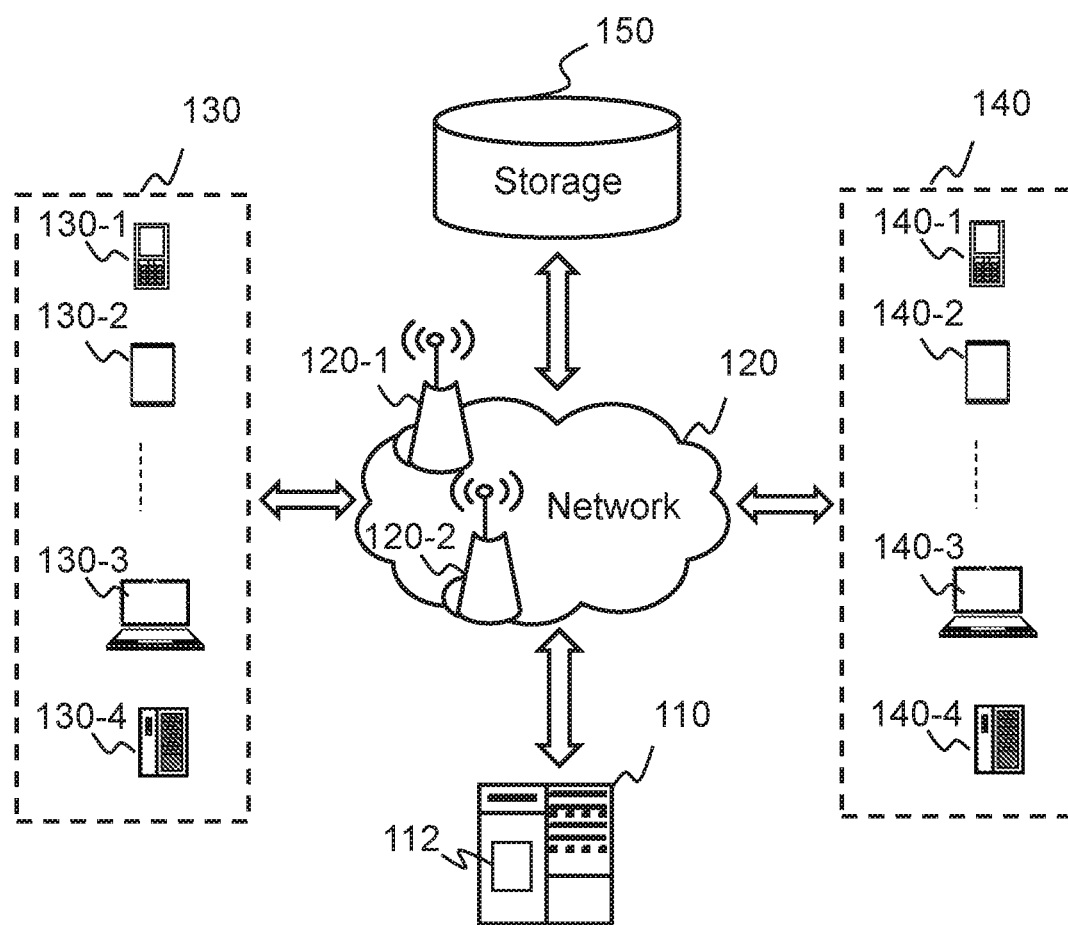
FIG. 1 is a block diagram of an exemplary online on-demand service system 100 according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to determine an estimated time of arrival (ETA) of a route in an on-demand service order, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a webpage, a plug-in of a browser, a client terminal, a custom system, an internal analysis system, an artificial intelligence robot, or the like, or any combination thereof.

The term "passenger," "requester," "requestor," "service requester," "service requestor" and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "request," "service," "service request," and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for determining an ETA of a target route for an on-demand service order, such as taxi hailing service, goods delivery service, chauffeur service, express car service, carpool service, bus service, short-term driver-renting service, shuttle service, etc. In some embodiments, a server may obtain feature data related to the on-demand service order. The feature data may include but is not limited to data related to a start location and/or a destination, the ETA from the start location to the destination, the real time of arrival from the start location to the destination, traffic data (e.g., traffic lights in the on-demand order, road type, traffic condition, etc.), user information data (e.g., passenger preferences, driver preferences, etc.), etc. The feature data may be historical data related to historical orders and/or real-time data related to current orders. The server may configure a parallel computing framework. The parallel computing framework may include Spark framework, Hadoop, Phoenix, Disco, Mars, or the like, or any combination thereof. The parallel computing framework may include a manager node and multiple worker nodes. The server may allocate the feature data to the worker nodes and may generate a sub-ETA model on each of the work nodes based on the allocated feature data. The sub-ETA model may be generated based on decision tree algorithms, such as Extreme Gradient Boosting (XGboost), Gradient Boosting Decision Tree (GBDT), Random Forest, etc. In some embodiment, the server may further generate a global ETA model based on the one or more sub-ETA models. Furthermore, the server may obtain a target route and generate an ETA corresponding to the target route based on the global ETA model.

FIG. 1 is a block diagram of an exemplary online on-demand service system 100 according to some embodiments of the present disclosure. For example, the online on-demand service system 100 may be an online on-demand service platform for on-demand services such as taxi hailing service, goods delivery service, chauffeur service, express car service, carpool service, bus service, short-term driver-renting service, and shuttle service. The online on-demand service system 100 may be an online platform including a server 110, a network 120, a requester terminal 130, a provider terminal 140, and a storage 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the storage 150 via the network 120. As another example, the server 110 may be directly connected to the requester terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may collect information of a plurality of historical on-demand services and/or current on-demand services, and determine an ETA of a target route. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the online on-demand service system 100 (e.g., the server 110, the requester terminal 130, the provider terminal 140, and the database 150) may send information and/or data to other component(s) in the online on-demand service system 100 via the network 120. For example, the server 110 may obtain/acquire service request from the requester terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online on-demand service system 100 may be connected to the network 120 to exchange data and/or information.

In some embodiments, a requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be similar to, or the same device as the requester terminal 130. In some embodiments, the provider terminal 140 may be a device with positioning technology for locating the position of the provider and/or the provider terminal 140. In some embodiments, the requester terminal 130 and/or the provider terminal 140 may communicate with other positioning device to determine the position of the requester, the requester terminal 130, the provider, and/or the provider terminal 140. In some embodiments, the requester terminal 130 and/or the provider terminal 140 may send positioning information to the server 110. The server 110 may generate a target route based on the positioning information from the provider terminal 140 and/or the requester terminal 130. The server 110 may further determine an ETA of the generated target route.

The storage 150 may store data and/or instructions. In some embodiments, the storage 150 may store data obtained from the requester terminal 130 and/or the provider terminal 140. In some embodiments, the storage 150 may store data and/or instructions that the server 110 may execute or use to perform exemplary methods described in the present disclosure. In some embodiments, the storage 150 may store feature data (e.g., ETA) of on-demand service orders. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components in the online on-demand service system 100 (e.g., the server 110, the requester terminal 130, the provider terminal 140, etc.). One or more components in the online on-demand service system 100 may access the data or instructions stored in the storage 150 via the network 120. In some embodiments, the storage 150 may be directly connected to or communicate with one or more components in the online on-demand service system 100 (e.g., the server 110, the requester terminal 130, the provider terminal 140, etc.). In some embodiments, the storage 150 may be part of the server 110.

In some embodiments, one or more components in the online on-demand service system 100 (e.g., the server 110, the requester terminal 130, the provider terminal 140, etc.) may have a permission to access the storage 150. In some embodiments, one or more components in the online on-demand service system 100 may read and/or modify information relating to the requester, provider, and/or the public when one or more conditions are met. For example, the server 110 may read and/or modify one or more users' information after a service. As another example, the provider terminal 140 may access information relating to the requester when receiving a service request from the requester terminal 130, but the provider terminal 140 may not modify the relevant information of the requester.

In some embodiments, information exchanging of one or more components in the online on-demand service system 100 may be achieved by way of requesting a service. The object of the service request may be any product. In some embodiments, the product may be a tangible product, or an intangible product. The tangible product may include food, medicine, commodity, chemical product, electrical appliance, clothing, car, housing, luxury, or the like, or any combination thereof. The intangible product may include a service product, a financial product, a knowledge product, an internet product, or the like, or any combination thereof. The internet product may include an individual host product, a web product, a mobile internet product, a commercial host product, an embedded product, or the like, or any combination thereof. The mobile internet product may be implemented as a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
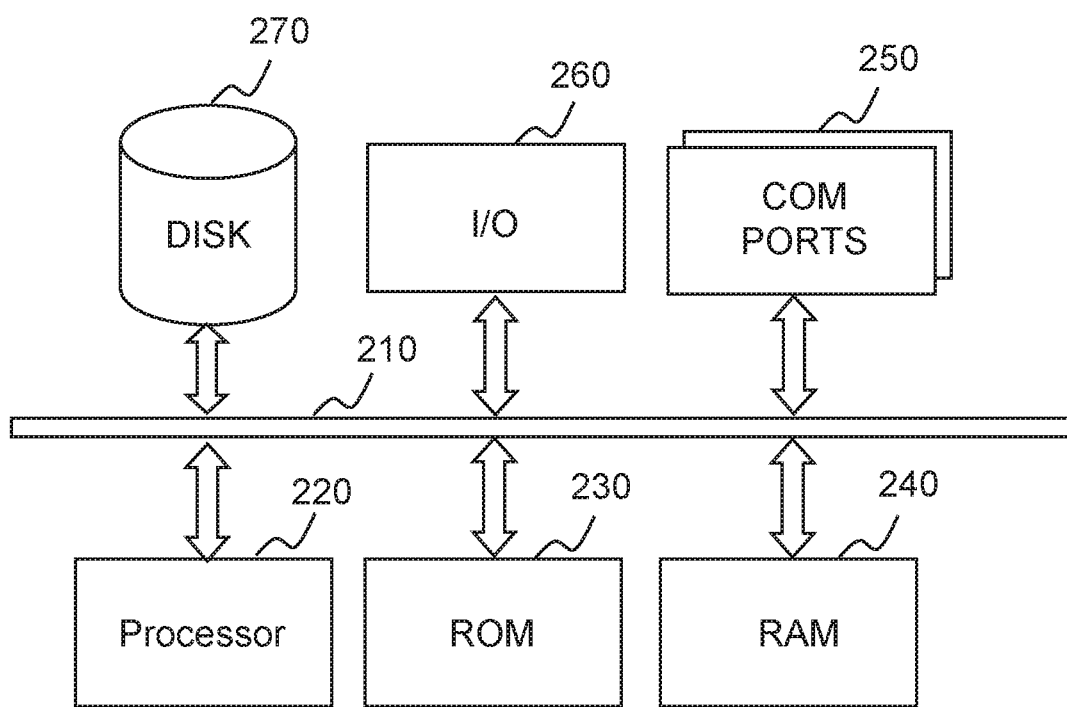
FIG. 2 is a schematic diagram illustrating exemplary hardware and software components of a computing device 200 according to some embodiments of the present disclosure.

FIG. 2 is a schematic diagram illustrating exemplary hardware and software components of a computing device 200 on which the server 110, the requester terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor 220 (e.g., logic circuits) for executing computer instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computer instructions may include, for example, routines, programs, objects, components, data structures, procedures, modules, and functions, which perform particular functions described herein. For example, the processor 220 may obtain feature data (e.g., ETA, distance from the start location to the destination, traffic light, road type, etc.) related to the on-demand service order. In some embodiments, the processor 220 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. The exemplary computer platform may include an internal communication bus 210, program storage and data storage of different forms, for example, a disk 270, and a read only memory (ROM) 230, or a random-access memory (RAM) 240, for various data files to be processed and/or transmitted by the computer. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 also includes an VI/O component 260, supporting input/output between the computer and other components (e.g., user interface elements). The computing device 200 may also receive programming and data via network communications.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor 220 of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

FIG. 3-A is a block diagram illustrating an exemplary processing engine 112 according to some embodiments of the present disclosure. The processing engine 112 may include an acquisition module 302, a determination module 304, and a direction module 306. Each module may be a hardware circuit that is designed to perform the following actions, a set of instructions stored in one or more storage media, and/or a combination of the hardware circuit and the one or more storage media.

The acquisition module 302 may be configured to obtain feature data related to an on-demand service order. The on-demand service order may include but is not limited to taxi hailing service order, goods delivery service order, chauffeur service order, express car service order, carpool service order, bus service order, short-term driver-renting service order, and shuttle service order. The feature data may include data related to a start location and/or a destination, an ETA from the start location to the destination, the real time of arrival from the start location to the destination, traffic data (e.g., traffic lights in the on-demand order, road type, traffic condition, etc.), user information data (e.g., passenger preferences, driver preferences, etc.), or the like, or any combination thereof. The feature data may be historical data related to historical orders and/or real-time data related to current orders. The acquisition module 302 may obtain the feature data from the storage 150 via the network 120. The feature data may be transmitted to the determination module 304 or the direction module 306 to be further processed.

The acquisition module 302 may be configured to access a parallel computing framework. In some embodiments, the acquisition module 302 may access the local parallel computing framework by calling a corresponding application program interface (API). Alternatively, the acquisition module 302 may access a remote parallel framework via a GIS application server (e.g., ArcIMS, ArcGIS Server, etc.). The parallel computing framework may include Spark framework, Hadoop, Phoenix, Disco, Mars, or the like, or any combination thereof. The parallel computing framework may include a manager node and multiple worker nodes (as shown in FIG. 3-B). The multiple worker nodes may work simultaneously and share the working load so that the time of computation may be reduced. The manager node may control and supervise the multiple worker nodes. The acquisition module 302 may further send electronic signals to allocate the feature data to the manager node and/or multiple worker nodes. In some embodiments, the feature data allocated to different worker nodes may be different. For example, the feature data may be classified into multiple types based on the features therein. The same type of feature data may be allocated on a same worker node. Alternatively, feature data may be divided into a plurality of data sets based on the number of worker nodes. Each data set may be allocated on one of the worker nodes. In some embodiments, the acquisition module 302 may allocate the feature data evenly on the plurality of worker nodes, or the device may adjust the allocation of the feature data based on the properties of the plurality of the worker nodes (e.g., computing capability, memory size, speed, etc.).

The determination module 304 may be configured to determine an ETA of a target route. In some embodiments, the target route may be obtained from the acquisition module 302. Alternatively, a start location and a destination may be obtained from the acquisition module 302, and the determination module 304 may generate the target route based on the start location and the destination. More particularly, a plurality of routes may be generated based on the start location and the destination, and the determination module 304 may select a target route from the plurality of routes. The target route may be a route with shortest distance, least traffic light, best road condition, smallest number of cars, etc.

In some embodiments, the determination module 304 may train a sub-model on each of the worker nodes of the parallel computing framework accessed by the acquisition module 302 based on the feature data and the parallel computing framework. The determination module 304 may further generate a global model based on the one or more sub-models. The type of the global model may be the same as or different from the types of the one or more sub-models. The determination module 304 may determine an ETA of the target route based on the global model.

The direction module 306 may be configured to transmit an ETA of a target route to a user device (e.g., a requester terminal, a provider terminal). In some embodiments, the direction module 306 may transmit the ETA of the target in the form of a message using any suitable communication protocol via the network 120. The suitable communication protocol may include Hypertext Transfer Protocol (HTTP), Address Resolution Protocol (ARP), Dynamic Host Configuration Protocol (DHCP), File Transfer Protocol (FTP). In some embodiments, the direction module 306 may send information relating to the request of the on-demand service to the requester terminal 130 via the network 120. The information relating to the request of the on-demand service may include a start location, a destination, the target route, the ETA of the target route, or the like, or any combination thereof.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Any two of the modules may be combined as a single module, any one of the modules may be divided into two or more units.

FIG. 3-B is a schematic diagram illustrating an exemplary parallel computing framework according to some embodiments of the present disclosure. The parallel computing framework may include Spark framework, Hadoop, Phoenix, Disco, Mars, or the like, or any combination thereof. As shown in FIG. 3-B, the parallel computing framework may include a manager 312 and a plurality of worker nodes 314 (e.g., worker node 314-1, 314-2, 314-3, etc.). The manager 312 and the worker nodes 314 may communicate with each other via the network 120. The manager 312 may control the worker nodes 314. For example, the manager 312 may receive a job to be processed on the parallel computing framework. The manager 312 may divide the job into a plurality of sub-jobs and allocate the plurality of sub-jobs to the plurality of worker nodes 314.

In some embodiments, the manager 312 may supervise status of the worker nodes 314 (e.g., resource utilization of the worker nodes). For example, when the manager 312 finds some of the worker nodes 314 is broken or not executing their sub-job, the manager 312 may replace the broken worker nodes by new worker nodes to execute the sub-job of the broken worker nodes. In some embodiments, each of the worker nodes 314 may determine a sub-ETA model based on the feature data. In some embodiments, each of the sub-ETA models may be split into a root node and a plurality of leaf nodes. The leaf nodes may be classified into a plurality of groups. In some embodiments, the manager may configure a barrier between two of the plurality of groups. The barrier may prevent the worker node from executing a leaf node from a first group and a leaf node from a second group simultaneously. The manager may generate a global ETA model based on the plurality of sub-ETA models. Detailed description of the barrier may be found elsewhere in the present disclosure. See, e.g., FIG. 7 and the description thereof.

Figure 4:
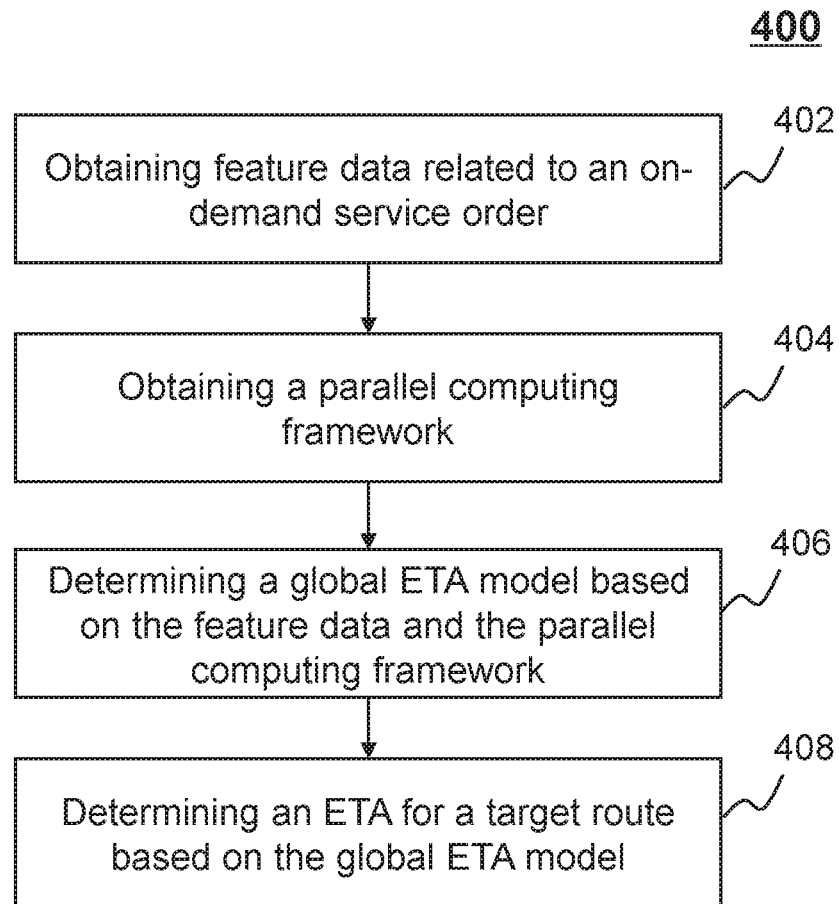
FIG. 4 is flowchart illustrating an exemplary process for determining an ETA according to some embodiments of the present disclosure.

FIG. 4 is flowchart illustrating an exemplary process for determining an ETA according to some embodiments of the present disclosure. The process and/or method 400 may be executed by a processor in the online on-demand service system 100 (e.g., the server 110, the processing engine 112, etc.). For example, the process and/or method 400 may be implemented as a set of instructions (e.g., an application) stored in a non-transitory computer readable storage medium (e.g., storage 150). The processor may execute the set of instructions and may accordingly be directed to perform the process and/or method 400 via receiving and/or sending electronic signals. In some embodiments, at least part of process 400 may be performed by computing device 200 shown in FIG. 2.

In 402, the processor (e.g., the acquisition module 302 and/or the processing circuits) may obtain feature data related to an on-demand service order. The on-demand service order may include but is not limited to taxi hailing service order, goods delivery service order, chauffeur service order, express car service order, carpool service order, bus service order, short-term driver-renting service order, and shuttle service order. The feature data may include data related to a start location and/or a destination, an ETA from the start location to the destination, the real time of arrival from the start location to the destination, traffic data (e.g., traffic lights in the on-demand order, road type, traffic condition, etc.), and user information data (e.g., passenger preferences, driver preferences, etc.), or the like, or any combination thereof. The feature data may be historical data related to historical orders and/or real-time data related to current orders.

In 404, the processor (e.g., the acquisition module 302 and/or the processing circuits) may obtain a parallel computing framework. The parallel computing framework may be a local and/or remote parallel computing framework. The parallel computing framework may be one of Spark framework, Hadoop, Phoenix, Disco, or Mars. The parallel computing framework may include a manager and multiple worker nodes (as shown in FIG. 3-B). In some embodiments, the processor may load structured data encoding the parallel computing framework to access to the parallel computing framework. In the parallel computing framework, the manager 312 and/or worker node 314 may be implemented on the server 110, the computing device 200, or the like. The manager 312 and worker node 314 may communicate with each other via the network 120. The manager 312 may receive a job from the processing engine 112. The manager 312 may divide the job into a plurality of sub-jobs and allocate the plurality of sub-jobs to the plurality of worker nodes 314 (e.g., 314-1, 314-2, 314-3).

In 406, the processor (e.g., the determination module 304 and/or the processing circuits) may determine a global ETA model based on the feature data and the parallel computing framework. In some embodiments, the global model may be a decision trees model that is suitable for parallel computing, such as XGboost, GBDT, Random Forest, or the like, or any combination thereof. When determining the global ETA model, the device may first determine a plurality of worker nodes, and then allocate the feature data on the plurality of worker nodes. The feature data allocated on each of the plurality of worker nodes may be different. For example, the feature data may be historical on-demand service orders in different periods. For example, the processor may allocate a first group of feature data (e.g., 7:00-8:00 am) to a first worker node 314-1, and allocate a second group of feature data (e.g., 9:00-10:00 am) to a second worker node 314-2. In some embodiments, the worker nodes 314 may each train a sub-ETA model based on the feature data allocated. For example, the first worker node 314-1 may train a first sub-ETA model by inputting the first group of feature data. The second worker node 314-2 may train a second sub-ETA model by inputting the second group of feature data. In some embodiments, the worker nodes may exchange information with each other before, during or after the training of the model. The information exchanged may be related to the feature data allocated or the models. For example, the first worker node 314-1 may transmit the feature data allocated or a summary of the feature data to the second worker node 314-2. As another example, the second worker node 314-2 may transmit a trained second sub-ETA model to the first worker node 314-1. In some embodiments, by exchanging information with each other, the plurality of worker nodes may generate the global ETA model. More particularly, the global ETA model may be determined based on the plurality of trained sub-ETA models.

In 408, the processor (e.g., the determination module 304 and/or the processing circuits) may determine an ETA of a target route based on the global ETA model. The target route may be a route from a start location to a destination. In some embodiments, the target route may correspond to an on-demand service order. For example, the target route may be a recommended route from a start location of an on-demand service order to the destination of the order. The start location and the destination may be received from a user device (e.g., a requester terminal 130, a provider terminal 140). In some embodiments, the processor may generate the target route based on a route planning algorithm. Alternatively, the processor may obtain the target route directly from a storage medium (e.g., storage 150). In some embodiments, the processor may input the target route to the global ETA model and the global ETA model may output an ETA of the target route in response.

Figure 5:
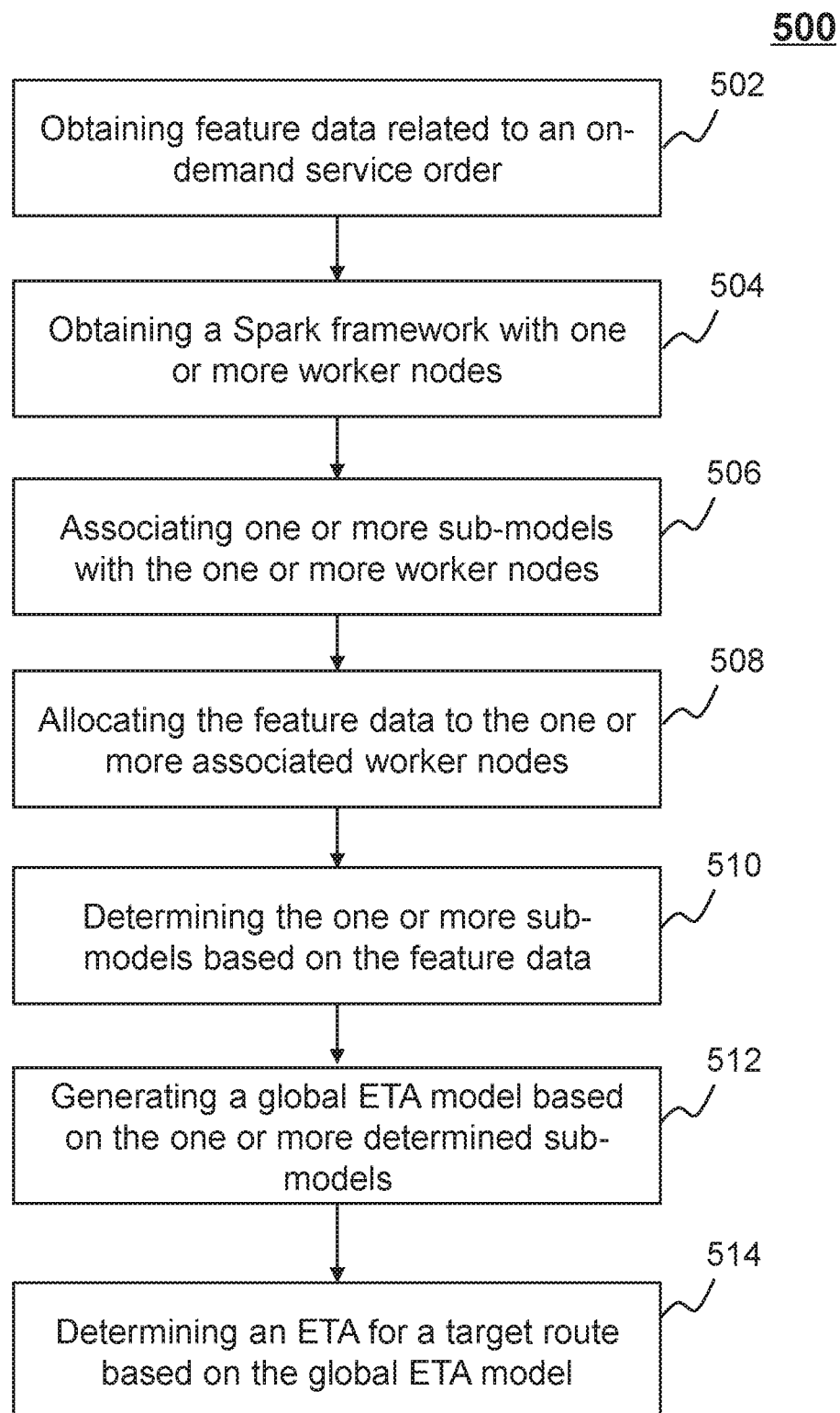
FIG. 5 is a flowchart illustrating an exemplary process for determining an ETA according to some embodiments of the present disclosure.

FIG. 5 is a flowchart illustrating an exemplary process for determining an ETA according to some embodiments of the present disclosure. The process and/or method 500 may be executed by a processor in the online on-demand service system 100 (e.g., the server 110, the processing engine 112, etc.). For example, the process and/or method 500 may be implemented as a set of instructions (e.g., an application) stored in a non-transitory computer readable storage medium (e.g., storage 150). The device may execute the set of instructions and may accordingly be directed to perform the process and/or method 500 via receiving and/or sending electronic signals. In some embodiments, at least part of process 500 may be performed by computing device 200 shown in FIG. 2.

In 502, the processor (e.g., the acquisition module 302 and/or the processing circuits) may obtain feature data related to an on-demand service order. The on-demand service order may include but is not limited to taxi hailing service order, goods delivery service order, chauffeur service order, express car service order, carpool service order, bus service order, short-term driver-renting service order, and shuttle service order. The feature data may include data related to a start location and/or a destination, an ETA from the start location to the destination, the real time of arrival from the start location to the destination, traffic data (e.g., traffic lights in the on-demand order, road type, traffic condition, etc.), and user information data (e.g., passenger preferences, driver preferences, etc.), or the like, or any combination thereof. The feature data may be historical data related to historical orders and/or real-time data related to current orders.

In 504, the processor (e.g., the acquisition module 302 and/or the processing circuits) may obtain a Spark framework. The Spark framework may be a fast large-scale data processing engine. The Spark framework may be a parallel computing framework. Alternatively, a similar parallel computing framework, such as Hadoop, Phoenix, Disco, or Mars, may be obtained in 504. The Spark framework may include a manager and multiple worker nodes (as shown in FIG. 3-B). In some embodiments, the processor may load structured data encoding the Spark framework to access the Spark framework. In the Spark framework, the manager 312 and/or worker node 314 may be implemented on the computing device 200. The manager 312 and worker node 314 may communicate with each other via the network 120. The manager 312 may be configure to receive a job from the processing engine 112. The manager 312 may divide the job into a plurality of sub-jobs and may allocate the sub-jobs to the plurality of worker nodes 314 (e.g., 314-1, 314-2, 314-3).

In 506, the processor (e.g., the acquisition module 302 and/or the processing circuits) may associate one or more sub-ETA model with the one or more worker nodes using the Spark framework. In some embodiments, the processor may configure the manager and/or the plurality of worker nodes in the Spark framework to train the one or more sub-ETA model, wherein each of the plurality of worker nodes is associated with one of sub-ETA models. For example, first worker node 314-1 may be configured to train first sub-ETA model, second worker node 314-2 may be configured to train second sub-ETA model, and third worker node 314-3 may be configured to train third sub-ETA model.

In 508, the processor (e.g., the acquisition module 302 and/or the processing circuits) may allocate the feature data to the one or more associated worker nodes. In some embodiments, the processor may determine a number of the plurality of worker nodes, and allocate the feature data on the plurality of worker nodes based on the number. In some embodiments, the processor may allocate the feature data evenly to the plurality of worker nodes, or the device may adjust the allocation of the feature data based on the properties of the plurality of the worker nodes (e.g., computing capability, memory size, speed, etc.). In some embodiments, the feature data allocated on each of the plurality of worker nodes may be different. For example, the processor may classify the feature data into a plurality of groups. Each of the plurality of groups of feature data may be allocated by the device to one of the worker nodes. For example, the processor may allocate a first group of feature data to the first worker node 314-1. The processor may allocate a second group of feature data to the second worker node 314-2. The processor may allocate a third group of feature data to the third worker node 314-3. It is understood for persons having ordinary skills in the art that the way of allocating feature data may be varied. All such variation are within the protection scope of the present disclosure.

In some embodiments, the feature data may be classified according to one or more criteria. For example, the processor may classify the feature data based on a criterion related to time, e.g., whether the feature data is in the past six months, or the past week, whether the feature data is in a particular period of the day, etc. As another example, the device may classify the feature data based on a criterion related to geographic location. For example, the feature data may be grouped based on the streets, blocks, cities, towns, countries, etc.

In 510, the processor (e.g., the determination module 304 and/or the processing circuits) may determine one or more sub-ETA models based on the feature data. In some embodiments, the sub-ETA models may be one of decision tree models, such as XGboost, GBDT, Random Forest, or the like, or any combination thereof. The decision tree model may be tree-structured predictive model. Each of the decision tree models may include one root node and multiple leaf nodes. The sub-ETA model may be obtained by training a model based on the feature data. When training the model, each of the plurality worker nodes may generate a decision tree by splitting the feature data based on a split rule. The split rule may be an objective function. The value of the objective function may depend on a training loss that measures how well the model fit on the training data and a regularization that measures the complexity of the model. The training loss may include square loss, or logistic loss, etc. Detailed method of generating the sub-ETA models may be found elsewhere in the present disclosure. See, e.g., FIG. 6 and the descriptions thereof.

In some embodiments, the worker nodes 314 may each train a sub-ETA model based on the feature data allocated. For example, the first worker node 314-1 may train a first sub-ETA model by inputting the first group of feature data. The second worker node 314-2 may train a second sub-ETA model by inputting the second group of feature data. In some embodiments, the worker nodes may exchange information with each other before, during or after the training of the model. The information exchanged may be related to the feature data allocated or the models. For example, the first worker node 314-1 may transmit the feature data allocated or a summary of the feature data to the second worker node 314-2. As another example, the second worker node 314-2 may transmit a trained second sub-ETA model to the first worker node 314-1.

In 512, the processor (e.g., the determination module 304 and/or the processing circuits) may generate a global ETA model based on the one or more trained sub-ETA models. For example, first worker node 314-1 may train a first sub-ETA model, second worker node 314-2 may train a second sub-ETA model, and third worker node 314-3 may train a third sub-ETA model. The processor may determine the global ETA model based on the first sub-ETA model, the second sub-ETA model and the third sub-ETA model.

In 514, the processor (e.g., the determination module 304 and/or the processing circuits) may determine an ETA of a target route based on the global ETA model. The target route may be a route from a start location to a destination. In some embodiments, the target route may correspond to an on-demand service order. For example, the target route may be a recommended route from a start location of an on-demand service order to the destination of the order. The start location and the destination may be received from a user device (e.g., a requester terminal 130, a provider terminal 140). In some embodiments, the processor may generate the target route based on a route planning algorithm. Alternatively, the processor may obtain the target route directly from a storage medium (e.g., storage 150). In some embodiments, the processor may input the target route to the global ETA model and the global ETA model may output an ETA of the target route in response. In some embodiments, the processor may further transmit the ETA to a user device (e.g., the requester terminal 130, the provider terminal 140).

FIG. 6-A is a schematic diagram illustrating exemplary training data of a model according to some embodiments of the present disclosure. As shown in FIG. 6-A, the horizontal axis may represent number of cars and the vertical axis may represent an estimated time of arrival (ETA). In some embodiments, training data 610 (e.g., point 610-A, point 610-B) may be obtained based on historical orders. For example, a device in the online on-demand service system 100 (e.g., the processing engine 112) may obtain a plurality of historical orders. Each of the plurality of historical orders may include feature data (e.g., a start location, a destination, a planned route from the start location to the destination, an ETA of the planned route, a real route, a real time of arrival, a user preference, etc.). The device may extract the number of cars and ETA from the plurality of historical orders and generate the training data 610 based on the extracted information. In a case that the ETA is not included in the historical orders, the device may extract the real time of arrival and generate the training data based on the real time of arrival and the number of cars. In some embodiments, the training data 610 may exist in a form of points, tables, relationships, graphs, etc. Alternatively, the training data 610 may exist in a form of electronic signals. The device may train a model (or a sub-ETA model) based on the training data 610 and the model may generate a plurality of internal parameters or structures (e.g., a tree) in response to the training data 610. Then when a value of the number of car is inputted into the trained model, the model may output a corresponding ETA. In some embodiments, the model trained by training data 610 may be combined with other trained models. For example, a plurality of sub-ETA models may be trained. Each of the trained sub-ETA model may correspond to a relationship between a feature and ETA. The plurality of sub-ETA models may be combined to generate a global ETA model. The global ETA model may be a hybrid model that may generate an ETA based on an input of multiple feature data. In some embodiments, the training data 610 may correspond to a same route during different time periods. In some other embodiments, the training data 610 may correspond to different routes during a same or different time period.

FIG. 6-B is a schematic diagram illustrating a structure of a model according to some embodiments of the present disclosure. As shown in FIG. 6-B, a tree-structured model 620 may be generated by a device of the system 100 based on the training data 610 in connection with FIG. 6-A. The tree-structured model 620 may include a root node 630 which correspond to a feature of the training data (e.g., number of cars). The root node 630 may be split into a plurality of leaf nodes 640 (e.g., leaf nodes 640-A, 640-B and 640-C). Each of the leaf nodes 630 may be generated based on a split rule related to the feature of the training data. For example, leaf node 640-A may be obtained based on a split rule that number of cars is smaller than or equal to a. In some embodiments, the device may generate a prediction score (e.g., A, B, and C) for each of the leaf node 640. The prediction score may correspond to another feature of the training data (e.g., ETA).

FIG. 6-C is a schematic diagram illustrating exemplary training data of a model and the trained model according to some embodiments of the present disclosure. In some embodiments, the data points 650 may be the same as data points 610 and the segments 660 may correspond to the leaf nodes 640. For example, split positions a and b may correspond to the values in split rules and the height in each segment (e.g., A, B and C) may correspond to the prediction score in connection with FIG. 6-B.

In some embodiments, a model may be split by a plurality of ways and each way of splitting may correspond to particular split positions and prediction scores. Each way of splitting may also correspond to particular segments. For example, FIG. 6-D, and FIG. 6-E may each correspond to a trained model by a way of splitting other than the way of splitting in FIG. 6-B. In some embodiments, an optimal way of splitting may be selected from the plurality of ways of splitting. More particularly, the optimal way of splitting may be determined based on an objective function as follows:

$$obj(\Theta) = L(\Theta) + \Omega(\Theta) \tag{1}$$

wherein, $obj(\Theta)$ may denote an objective function, $L(\Theta)$ may denote a training loss that measures how well the model fit on the training data, and $\Omega(\Theta)$ may denote a regularization that measures the complexity of the model. In some embodiments, the optimal way of splitting may have the smallest value of the objective function $obj(\Theta)$. As shown in FIG. 6-D, 670 may have an excess amount of segments (steps). The segments in 670 may have good fitting on the training data (e.g., a small $L(\Theta)$) but may be complex (e.g., a big $\Omega(\Theta)$, and thus result in a big value of the objective function. Oppositely, 680, as shown in FIG. 6-E, may not have sufficient segments to describe the trend of the training data. The segments in 680 may be simple (e.g., a small $\Omega(\Theta)$) but have bad fitting on the training data (e.g., a big $L(\Theta)$), and thus also result in a big value of the objective function. As shown in FIG. 6-C, as the segments 660 have a good balance between the degree of fitting and the complexity, the $\Omega(\Theta)$ and $L(\Theta)$ may both be reasonably small. Thus the value of objective function of the model split in a way illustrated in FIG. 6-C may be small and the way of splitting the model in FIG. 6-C may be selected as the optimal way of splitting. Then the model may be split based on the optimal way of splitting and a trained model may be generated.

It should be noted that the above description is merely provided for the purposes of illustration, and not intended to limit the scope of the present disclosure. For persons having ordinary skills in the art, various variations and modifications may be conducted under the teaching of the present disclosure. For example, the training data 610 may be generated based on other features. As another example, the model may be split by other ways of splitting other than those illustrated in FIG. 6-C, FIG. 6-D, and FIG. 6-E, and a way of splitting that is better than FIG. 6-C may be selected as the optimal way of splitting. As a further example, each of the leaf node may be further split into a plurality of leaf nodes. However, those variations and modifications may not depart the protecting scope of the present disclosure.

FIG. 7-A, FIG. 7-B and FIG. 7-C are schematic diagrams illustrating structures of models according to some embodiments of the present disclosure. In some embodiments, models 710, 720 and 730 may each represent a trained sub-model. More particularly, the models 710, 720 and 730 may correspond to worker nodes 314-1, 314-2 and 314-3 respectively. As described elsewhere in the present disclosure, the models 710, 720 and 730 may be combined by a device (e.g., the processing engine 112) of the online on-demand service system 100 to generate a global model.

As shown in FIG. 7-A, a node 711 may be a root node related to a first feature (e.g., a driving distance). The root node 711 may be split by the model 710 (or the worker node 314-1) into a plurality of leaf nodes 712 (e.g., leaf nodes 712-1 and leaf nodes 712-2). Each of the plurality of leaf nodes 712 may be obtained based on a split rule related to the first feature. For example, leaf node 712-1 may be obtained based on a split rule that the driving distance is less than or equal to 500 m. In other words, input data of the model 710 with driving distance less than or equal to 500 m may be processed to the leaf node 712-1. Similarly, the leaf node 712-2 may be obtained based on a split rule that the driving distance is greater than 500 m. In some embodiments, the plurality of leaf nodes 712 may each relate to a feature. For example, the leaf node 712-1 is related to road type and the leaf node 712-2 is related to traffic light. Each of the leaf nodes 712 may be further split into a plurality of leaf nodes 713 based on a split rule related to the corresponding feature. For example, the leaf node 712-1 may be split into a leaf node 713-1 and a leaf node 713-2 based on a split rule related to the road type (e.g., whether the input data is a one-way road or a two-way road). The leaf node 712-2 may be split into a leaf node 713-3 and a leaf node 713-4 based on a split rule related to the road type (e.g., whether the number of traffic light of input data is more than or less than three).

Similar to model 710, model 720 and model 730 are tree-structured models generated by splits of root node 721 and root node 731 respectively. For example, leaf nodes 722 (e.g., leaf node 722-1, 722-2, and 722-3) may be generated in the first split of the root node 721 based on a split rule related to a feature of the root node 721 (e.g., a driving distance). As another example, leaf nodes 733 (e.g., leaf node 733-1 and leaf node 733-2) may be generated in the second split of the root node 731 based on a split rule related to a feature of a leaf node 732-1 (e.g., a traffic light).

In some embodiments, a device of the online on-demand system 100 (e.g., server 110) may classify the leaf nodes into a plurality of groups. For example, leaf nodes 712 may be generated in the first split of the root node 711 and may be classified into a first group. As another example, leaf nodes 723 may be generated in the second split of root node 721 (or the splits of leaf nodes 722) and may be classified into a second group. In some embodiments, leaf nodes in different models may be classified into the same groups. For example, leaf nodes 712,722 and 732 may be classified into a first group as they are all generated in the first split of their corresponding root node respectively. Similarly, leaf node 713, 723 and 733 may be classified into a second group as they are all generated in the second split of their corresponding root node respectively.

In some embodiments, a device of the online on-demand system 100 (e.g., the server 110) may configure one or more barriers between two of the plurality of groups of leaf nodes. For example, a barrier 740 may be configured between the first group of leaf nodes (e.g., leaf nodes 712,722 and 732 that are generated in the first split of root nodes) and the second group of leaf nodes (e.g., leaf nodes 713, 723 and 733 that are generated in the second split of root nodes). In some embodiments, the barrier 740 may synchronize the splitting process of the models. For example, the models 710, 720 and 730 may perform multiple times of splits on the root node 711, 721 and 731 respectively to generate the plurality of groups of leaf nodes. Each group of leaf nodes may correspond to a time of split. The barrier 740 may force the faster model to wait for the slower model so that all the models are in the same time of split. In other words, the barrier 740 may prevent the models 710, 720 and 730 to split the first group of leaf nodes and the second group of leaf nodes simultaneously. For example, if the split of root nodes 711 is completed earlier than the split of root nodes 721 and 731, the barrier may force the model 710 to wait until the splits of the root nodes 721 and 731 are completed before perform a further split of leaf nodes 712 and generate leaf nodes 713.

Figure 8:
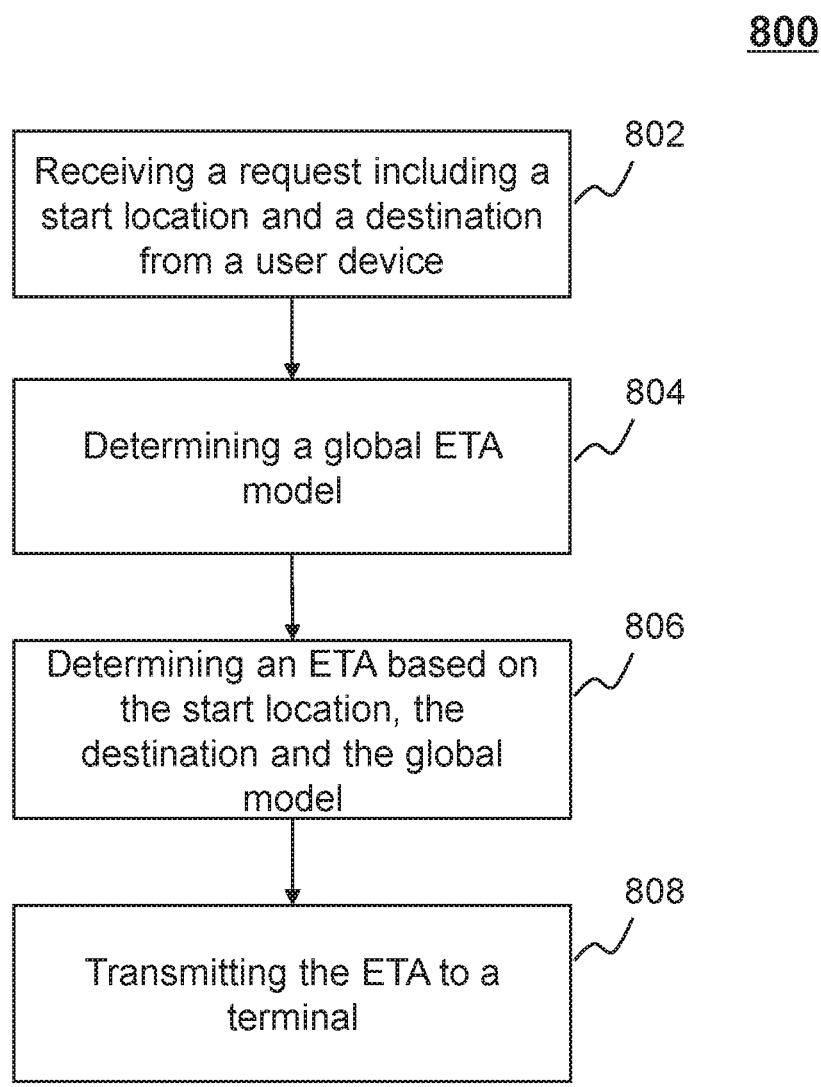
FIG. 8 is a flowchart illustrating an exemplary process for generating an ETA according to some embodiments of the present disclosure.

FIG. 8 is a flowchart illustrating an exemplary process for transmitting an ETA according to some embodiments of the present disclosure. The process and/or method 800 may be executed by a processor (e.g., the processing engine 112, the server 110, etc.) in the online on-demand service system 100. For example, the process and/or method 800 may be implemented as a set of instructions (e.g., an application) stored in a non-transitory computer readable storage medium (e.g., storage 150). The processor may execute the set of instructions and may accordingly be directed to perform the process and/or method 800 via receiving and/or sending electronic signals. In some embodiments, at least part of process 800 may be performed by computing device 200 shown in FIG. 2.

In 802, the processor (e.g., the acquisition module 302 and/or the processing circuits) may receive a request from a user device. For example, the processor may receive the request from the requestor terminal 130 via the network 120. The request may include a start location, a destination, a departure time (e.g., the present moment, an appointment time), etc.

In 804, the processor (e.g., the determination module 304 and/or the processing circuits) may determine a global ETA model. In some embodiments, the global ETA model may generate an ETA in response to the request. The global ETA model may be one or more decision trees models that are suitable for the parallel computing, such as XGboost, GBDT, Random Forest, or the like, or any combination thereof. The processor may determine the global ETA model based on a plurality of sub-ETA models. The plurality of sub-ETA models may be trained by the device based on feature data from the historical on-demand service orders and/or the current on-demand service orders on a parallel computing framework. The parallel computing framework may be one of Spark framework, Hadoop, Phoenix, Disco, or Mars. The parallel computing framework may include a manager and multiple worker nodes. For example, the processor may load structured data encoding a parallel computing framework including a plurality of worker nodes, wherein each of the plurality of worker nodes is associated with one of the plurality of sub-ETA models. The processor may send electronic signals to allocate the feature data to the plurality of worker nodes. Each of the worker nodes on the parallel computing framework may train the corresponding sub-ETA model based on the feature data. The global ETA model may be then generated based on the plurality of trained sub-ETA models.

In 806, the processor (e.g., the determination module 304 and/or the processing circuits) may determine an ETA based on the start location, the destination and the global ETA model. In some embodiments, the processor may generate a plurality of routes from the start location to the destination based on a route-planning algorithm. The processor may generate a plurality of ETA corresponding to the plurality of routes based on the global ETA model. Alternatively, the processor may select a target route from the plurality of routes. The target route may be a route with shortest distance, least traffic light, best road condition, smallest number of cars, etc. The processor may only generate ETA corresponding to the target route.

In 808, the processor (e.g., the direction module 306 and/or the processing circuits) may transmit signals encoding the determined ETA to the user device. The user device may be the requestor terminal 130 and/or the provider terminal 140. The determined ETA may be presented on the requestor terminal 130 and/or the provider terminal via one or more user interfaces (not shown in the figure). In some embodiments, the determined ETA may be transmitted and/or received in the form of a message using any suitable communication protocol via the network 120. The suitable communication protocol may include Hypertext Transfer Protocol (HTTP), Address Resolution Protocol (ARP), Dynamic Host Configuration Protocol (DHCP), File Transfer Protocol (FTP). The network 120 may be any type of wired or wireless network, or any combination thereof. It is understood that the wired network may be any electronic signal and the wireless network may be any wireless signal.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the preceding.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for determining an estimated time of arrival (ETA), comprising:
   at least one storage medium including a set of instructions; and
   at least one processor configured to communicate with the at least one storage medium, wherein when executing the set of instructions, the at least one processor is directed to:
   receive a start location and a destination from a user device;
   obtain a global ETA model from a storage medium, wherein to generate the global ETA model, the at least one processor is further directed to:
   obtain feature data related to an on-demand service;
   determine a plurality of sub-ETA models;
   obtain a parallel computing framework including a plurality of worker nodes, wherein each of the plurality of worker nodes is associated with a sub-ETA model of the plurality of sub-ETA models;
   allocate the feature data to the plurality of worker nodes;
   train the plurality of sub-ETA models based on the feature data; and
   generate the global ETA model based on the plurality of trained sub-ETA models;
   determine an ETA for a target route connecting the start location and the destination based on the global model; and
   send the determined ETA to the user device.

2. The system of claim 1, wherein to generate the global ETA model, the at least one processor is further directed to split each of the plurality of worker nodes into a root node and a plurality of leaf nodes based on a split rule.

3. The system of claim 2, wherein to generate the global ETA model, the at least one processor is further directed to:
   classify the plurality of leaf nodes into a plurality of groups; and
   determine at least one barrier based on the plurality of leaf nodes, wherein the at least one barrier is configured between two of the plurality of groups of the leaf nodes.

4. The system of claim 3, wherein the at least one barrier prevents the plurality of worker nodes from executing a first group of the leaf node and a second group of the leaf node simultaneously.

5. The system of claim 1, wherein to allocate the feature data to the plurality of worker nodes, the at least one processor is further directed to:
   determine a number of the plurality of worker nodes; and
   allocate the feature data based on the number of the plurality of worker node on the plurality of worker nodes, wherein the feature data allocated on each of the plurality of worker nodes are different.

6. The system of claim 1, wherein the plurality of worker nodes includes:
   a first worker node operating a first sub-ETA model with first feature data as input;
   a second worker node operating a second sub-ETA model with second feature data as input; and
   the first worker node transmits the first feature data to the second worker node.

7. The system of claim 1, wherein the global ETA model includes an Extreme Gradient Boosting model.

8. A method for determining an estimated time of arrival (ETA), comprising:
   receiving, by at least one computer server via a network, a start location and a destination from a user device;
   obtaining, by the at least one computer server, a global ETA model from a storage medium, wherein the global ETA model is generated according to a process, the process including:
      obtaining feature data related to an on-demand service;
      determining a plurality of sub-ETA models;
      obtaining a parallel computing framework including a plurality of worker nodes, wherein each of the plurality of worker nodes is associated with a sub-ETA model of the plurality of sub-ETA models;
      allocating the feature data to the plurality of worker nodes;
      training the plurality of sub-ETA models based on the feature data; and
      generating the global ETA model based on the plurality of trained sub-ETA models;
   determining, by the at least one computer server, an ETA for a target route connecting the start location and the destination based on the global model; and
   sending, by the at least one computer server via the network, the determined ETA to the user device.

9. The method of claim 8, wherein the process of generating the global ETA model further includes splitting each of the plurality of worker nodes into a root node and a plurality of leaf nodes based on a split rule.

10. The method of claim 9, wherein the process of generating the global ETA model further includes
    classifying the plurality of leaf nodes into a plurality of groups; and
    determining at least one barrier based on the plurality of leaf nodes, wherein the at least one barrier is configured between two of the plurality of groups of the leaf nodes.

11. The method of claim 10, wherein the at least one barrier prevents the plurality of worker nodes from executing a first group of the leaf node and a second group of the leaf node simultaneously.

12. The method of claim 8, wherein the allocating the feature data to the plurality of worker nodes includes:
    determining a number of the plurality of worker nodes; and
    allocating the feature data based on the number of the plurality of worker node on the plurality of worker nodes, wherein the feature data allocated on each of the plurality of worker nodes are different.

13. The method of claim 8, wherein the plurality of worker nodes includes
    a first worker node operating a first sub-ETA model with first feature data as input;
    a second worker node operating a second sub-ETA model with second feature data as input; and
    the first worker node transmits the first feature data to the second worker node.

14. The method of claim 8, wherein the global ETA model includes an Extreme Gradient Boosting model.

15. A non-transitory computer readable medium, comprising at least one set of instructions for determining an estimated time of arrival (ETA), wherein when executed by at least one processor of an electronic terminal, the at least one set of instructions directs the at least one processor to perform acts of:
    receiving a start location and a destination from a user device;
    obtaining a global ETA model from a storage medium, wherein the global ETA model is generated according to a process, the process including:
       obtaining feature data related to an on-demand service;
       determining a plurality of sub-ETA models;
       obtaining a parallel computing framework including a plurality of worker nodes, wherein each of the plurality of worker nodes is associated with a sub-ETA model of the plurality of sub-ETA models;
       allocating the feature data to the plurality of worker nodes;
       training the plurality of sub-ETA models based on the feature data; and
       generating the global ETA model based on the plurality of trained sub-ETA models;
    determining an ETA for a target route connecting the start location and the destination based on the global model; and
    sending the determined ETA to the user device.

16. The non-transitory computer readable medium of claim 15, wherein the generating the global ETA model further includes splitting each of the plurality of worker nodes into a root node and a plurality of leaf nodes based on a split rule.

17. The non-transitory computer readable medium of claim 16, wherein the generating the global ETA model further includes:
    classifying the plurality of leaf nodes into a plurality of groups; and
    determining at least one barrier based on the plurality of leaf nodes, wherein the at least one barrier is configured between two of the plurality of groups of the leaf nodes.

18. The non-transitory computer readable medium of claim 17, wherein the at least one barrier prevents the plurality of worker nodes from executing a first group of the leaf node and a second group of the leaf node simultaneously.

* * * * *